United States Patent [19]

Miller et al.

[11] 4,378,987
[45] Apr. 5, 1983

[54] LOW TEMPERATURE METHOD FOR MAKING OPTICAL FIBERS

[75] Inventors: Stephen B. Miller, Corning; Peter C. Schultz, Painted Post, both of N.Y.

[73] Assignee: Corning Glass Works, Corning, N.Y.

[21] Appl. No.: 311,786

[22] Filed: Oct. 15, 1981

[51] Int. Cl.³ .................... C03B 37/025; C03B 37/07
[52] U.S. Cl. ...................................... 65/3.12; 65/18.2
[58] Field of Search ................. 65/3.12, 18.2, 144; 118/719, 725; 427/163; 501/37; 350/96.34

[56] References Cited

U.S. PATENT DOCUMENTS

| | | | |
|---|---|---|---|
| 4,188,089 | 2/1980 | Gliemeroth et al. | 350/96.34 |
| 4,217,027 | 8/1980 | MacChesney et al. | 501/37 X |
| 4,308,066 | 12/1981 | Mitachi et al. | 501/37 |
| 4,312,654 | 1/1982 | Sarkar | 65/3.12 |

FOREIGN PATENT DOCUMENTS

2062615  5/1981  United Kingdom .

Primary Examiner—Richard V. Fisher
Attorney, Agent, or Firm—William J. Simmons, Jr.

[57] ABSTRACT

A glass optical waveguide preform is formed by chemical reaction of gaseous and/or vaporized ingredients within a glass substrate tube. A reactant feed tube extends into a first end of the substrate tube. One of the reactants flows through the feed tube, and another flows through the annular channel between the feed and substrate tubes. The reactants combine just downstream of the end of the feed tube and react to form particulate material, at least a portion of which deposit in the substrate tube. The output end of the feed tube traverses the substrate tube so that the region of maximum soot deposition moves along the length of the substrate tube. A hot zone traverses the substrate tube in synchronism with the feed tube to sinter the deposited soot.

10 Claims, 12 Drawing Figures

LOW TEMPERATURE METHOD FOR MAKING OPTICAL FIBERS

BACKGROUND OF THE INVENTION

This invention relates to a low temperature method and apparatus for making optical fibers, and more particularly to such a method and apparatus which are useful in the manufacture of low loss optical waveguide fibers capable of propagating energy in the infrared region of the spectrum.

The overloaded condition of communication systems in the 1960's motivated a search for higher capacity transmission media. Although glass optical fibers were known, the attenuation thereof was too high for use in such systems. Improved processing techniques such as that disclosed in U.S. Pat. No. 3,711,262 have resulted in optical waveguide fibers having attenuation levels sufficiently low that they are now widely used in telecommunication systems. Such progress has been made in silica-based fibers that fibers of this type have been produced having attenuations less than 0.5 dB/km at 1.55 $\mu$m. It has been reported that the ultimate loss for silica glass fibers might be 0.18 dB/km, which is limited by intrinsic loss due to infrared absorption bands and Rayleigh scattering.

In order to achieve even lower loss transmission, materials capable of transmission in the infrared region of the spectrum are being investigated. The publication, J. R. Gannon, "Optical Fiber Materials for Operating Wavelengths Longer Than 2 $\mu$m", Journal of Non-Crystalline Solids, vol. 42 (1980), pp. 239-246, sets forth calculated attenuation minima for a number of potential materials. It is speculated that $ZnCl_2$ and $BeF_2$ should achieve attenuation minima of 0.001 dB/km at 3.7 and 2.1 $\mu$m, respectively.

U.S. Pat. No. 4,188,089 teaches a CVD technique for forming fibers having light-conducting regions formed of selected non-oxide compositions. A carrier gas such as chlorine or any other halogen or an inert gas such as He, Ar, or Kr entrains vapors of the reactant gases. All such vapors are premixed and delivered to the end of a substrate tube through which they flow unreacted until they reach the moving hot zone. Upon reaching the region of elevated temperature, a reaction takes place which causes a vitreous layer to be deposited within the substrate tube. This layer is composed predominantly of anions S, Se and/or Te. Cations are Ge, Si, P, B, As, Sb and/or Ti. The light transmitting core of the resultant optical waveguide fiber cannot include certain elements such as beryllium, zinc, aluminum, lead and the like which do not form volatile halides.

Fluoride glass fibers formed by a conventional rod drawing technique are disclosed in the publication, S. Mitachi et al., "Fluoride Glass Fiber for Infrared Transmission", Japanese Journal of Applied Physics, vol. 19, No. 6, June, 1980, pp. L313-L314. Mixtures of $GdF_3$, $BaF_2$ and $ZrF_4$ were melted at 800° C. in a gold crucible, and glass rods were prepared by pouring the melts into brass molds. The glass rods were drawn into fibers by a conventional fiber fabrication technique. Losses as low as 480 dB/km were measured at 3.39 $\mu$m for fibers several meters long.

U.S. Pat. No. 4,189,208 teaches a method of forming an optical fiber having a core of $ZnCl_2$ by drawing the fiber from a melt. Because of the impurities which are introduced into the fiber by forming it in this manner, such a technique has not been capable of providing fibers having losses as low as those which are formed by vapor deposition techniques.

U.S. Pat. No. 3,722,981 teaches a method of drawing low-melting fluoride glasses from a melt. Although it is estimated that the Rayleigh scattering loss of such fibers is about 1 dB/km, the impurity absorption losses of fibers formed by this technique are unacceptedly high. It is stated in the publication, Y. Ohishi et al., "Impurity Absorption Loss due to Rare Earth Elements in a Fluoride Glass", Japanese Journal of Applied Physics, vol. 20, No. 3, March, 1981, pp. L191-L193, that rare earth impurity concentration in fluoride optical fibers should be decreased to less than 0.1 ppbw in order to make the absorption loss 0.001 dB/km in the 3-4 $\mu$m wavelength range.

It is therefore an object of the present invention to provide a method and apparatus for forming by a vapor deposition process optical waveguide fibers which are suitable for transmitting energy in the infrared region of the spectrum.

Another object is to provide a method and apparatus for delivering highly reactive reactants to the deposition region of a substrate tube.

SUMMARY OF THE INVENTION

Briefly, the present invention relates to a method and apparatus for manufacturing a preform which is intended to be subsequently drawn into an optical filament. This method is of the type that includes the steps of flowing vapors of at least two glass-forming reactants into a hollow, cylindrical glass substrate. The vapor mixture is reacted within the substrate to produce particulate material which travels downstream where at least a portion thereof comes to rest on the inner surface of the substrate where it is fused to form a continuous glassy deposit on the inner surface of the substrate. The improvement of the present invention comprises maintaining the reactants separate until they reach the region of the substrate wherein the reaction product is produced.

In a preferred embodiment, the apparatus of the present invention comprises tubular means for maintaining one reactant separate from another reactant, at least one of the reactants flowing from the tubular means into the substrate tube. This apparatus is especially appropriate for producing by exothermic reaction in the substrate tube particulate material which deposits and is consolidated to form a layer of metal halide glass. Vaporous or volatile sources which provide the cation and anion of the resultant metal halide glass must be employed. The cationic vapor source is a compound containing the cation of the product glass which bears an organometallic substituent or other anionic substituent which renders the compound into a volatile state. The anionic vapor source is a halogenating agent.

DESCRIPTION OF PRIOR ART

Figure 1:
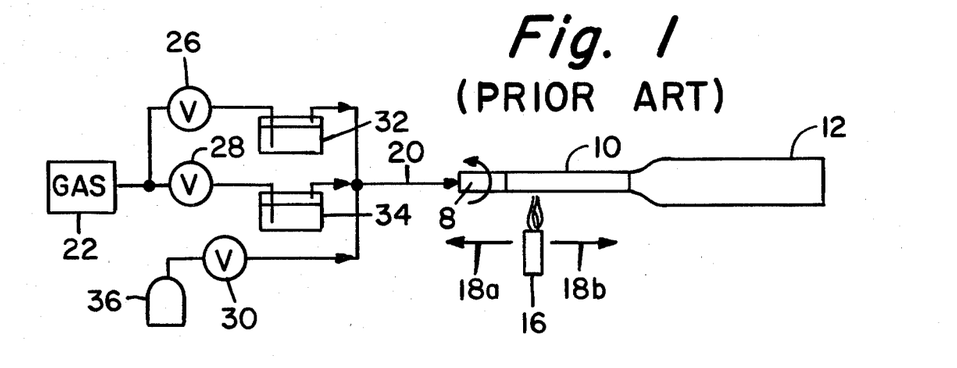
FIG. 1 is a schematic representation of a prior art apparatus for depositing a glass layer within a tube.
Figure 2:
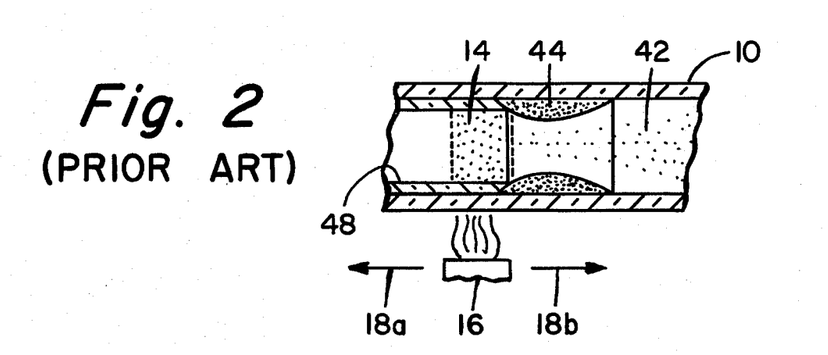
FIG. 2 shows a section of the tube of FIG. 1 depicting observed conditions during processing.

FIGS. 1 and 2 show a prior art system comprising a substrate tube 10 having handle tube 8 affixed to the upstream end thereof and exhaust tube 12 affixed to the downstream end thereof. Tubes 8 and 12 are chucked in a conventional glass-turning lathe (not shown), and the combination is rotated as indicated by the arrow. The handle tube, which may be omitted, is an inexpensive glass tube having the same diameter as the substrate tube, and it does not form a part of the resultant optical waveguide. A hot zone 14 is caused to traverse tube 10 by moving heating means 16 as schematically depicted by arrows 18a and 18b. Heating means 16 can consist of any suitable source of heat such as a plurality of burners encircling tube 10.

Reactants are introduced into tube 10 via inlet tube 20, which is connected to a plurality of sources of gases and vapors. Flow control valves are represented by a circle having the letter "V" therein. A source 22 of carrier gas is connected by valves 26 and 28 to reservoirs 32 and 34, respectively. The carrier gas may be any gas which is not incompatible with the reactants and with the reaction taking place in tube 10. Gases such as oxygen, chlorine, helium, argon, nitrogen and krypton have been employed or suggested. Reservoirs 32 and 34 usually contain normally liquid reactant materials which are introduced into tube 10 by bubbling the carrier gas therethrough. Gaseous source 36 is connected by valve 30 to inlet tube 20. Exiting material is exhausted through exhaust tube 12. Not shown is an arrangement of mixing valves, shutoff valves and system controller which may be utilized to meter flows and to make other necessary adjustments in composition.

Burner 16 initially moves at a low rate of speed relative to tube 10 in the direction of arrow 18b, the same direction as the reactant flow. Although the reactants are premixed, they do not react until they reach hot zone 14. The reaction produces a powdery suspension of particulate material, often referred to as "soot", which is carried downstream to region 42 of tube 10 by moving gas. As burner 16 moves in the direction of arrow 18b, hot zone 14 moves downstream so that a part of soot buildup 44 extends into the hot zone and is consolidated thereby to form a unitary, homogeneous glassy layer 48.

When burner 16 reaches the end of tube 10 adjacent to exhaust tube 12, the temperature of the flame is reduced and the burner returns at a faster rate in the direction of arrow 18a to the input end of tube 10. Thereafter, additional layers of glassy material are deposited within tube 10 in the manner described above. After suitable layers have been deposited to serve as the cladding, barrier layer and/or core material of the resultant optical waveguide fiber, the temperature of the glass is increased to cause tube 10 to collapse. This can be accomplished by reducing the rate of traverse of the hot zone.

In the deposition of oxide glasses, which are typically doped silicas, both the oxidation of the metal halide vapors and the sintering of the oxide soot only occur at an appreciable rate at temperatures above 1200° C. As a result, pure silica or a high silica content glass substrate tube is required to contain the process without becoming badly deformed. A consequence of the use of a refractory tube, however, is the need for even higher temperatures in the range of 1900° C. and above to accomplish the tube collapse and fiber draw steps.

The need for high temperature in all phases of this prior art process results in several disadvantages. The refractory glass substrate tubes which are required in this process are costly and are difficult to manufacture with close geometric tolerances and high glass quality. The furnaces capable of achieving 2000° C. for the fiber drawing step are generally expensive, difficult to control, and have relatively short refractory muffle/heating element lifetimes. In general, this high temperature process is costly from an energy consumption standpoint and requires complex equipment and procedures.

DESCRIPTION OF THE PREFERRED EMBODIMENTS

Figure 3:
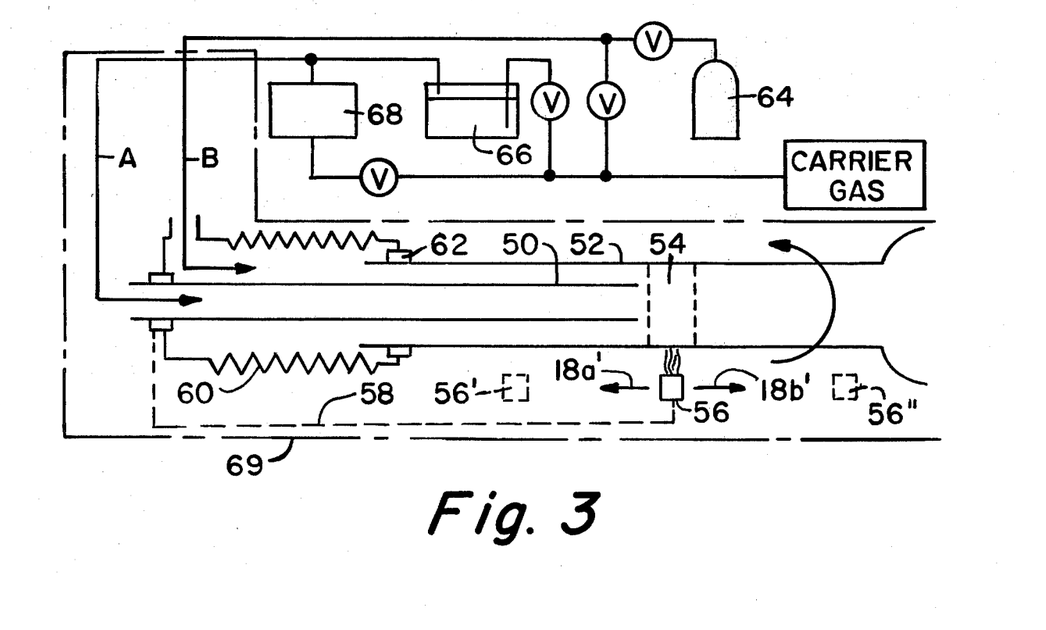
FIG. 3 is a schematic representation of an apparatus suitable for practice of the deposition process in accordance with the present invention.

In accordance with the present invention at least two reactants, referred to herein as reactant A and reactant B, are kept separated until they reach the desired reaction zone in the substrate tube. Each of reactants A and B comprises one or more compounds which do not react detrimentally among themselves. However, when reactants A and B are mixed, they begin to spontaneously react at ambient temperature to form a metal halide glass material in particulate form and gaseous by-products. As shown in FIG. 3, reactant A flows through a tube 50 which is situated on the axis of substrate tube 52. Reactant B is fed into substrate tube 52 and flows through the annular channel formed between tubes 50 and 52. In the illustrated embodiment the reaction zone where reactants A and B are combined is the hot zone 54 created by heat source 56. Thus, that portion of tube 50 within substrate tube 52 terminates just prior to the hot zone. Even though the reaction may be exothermic and require little or no heat for complete reaction to occur, heat source 56 should be employed for the purpose of consolidating the deposit of particulate material on the inner surface of tube 52. Burner 56 would not be needed if one or only a few layers of particulate material were deposited and were not consolidated until a later time such as during the fiber drawing operation. If the heat source were located along the length of tube 50, as illustrated at 56', it would preheat at least some of the reactant vapors as well as consolidate particulate matter as it moved in direction 18b'. Burner location 56' would be undesirable for certain reactants which would be adversely affected by the heat. If the burner were located at position 56", it would have to be located downstream from the reaction zone a distance sufficiently great to ensure that the thermophoresis effect would not be negated. Location 56" may be the most desirable burner position for a process which utilized a reactant that would be adversely affected by the heat generated thereby.

The reactant vapors may be obtained from various types of sources. Illustrated in FIG. 3 are gaseous source 64, liquid source 66 and solid source 68. Source 68 may be the type taught in U.S. Pat. No. 3,801,294. Reactants such as Be(CH$_3$)$_2$, which must be maintained at an elevated temperature to generate sufficient vapor pressure, must be transported through lines that are maintained at an elevated temperature to prevent condensation in the lines. If such a material is being employed, the appropriate delivery lines and the substrate tube can be situated in an oven represented by broken line 69. Also, delivery lines can be insulated or heated to prevent condensation.

Figures 4, 5, 6, 9:
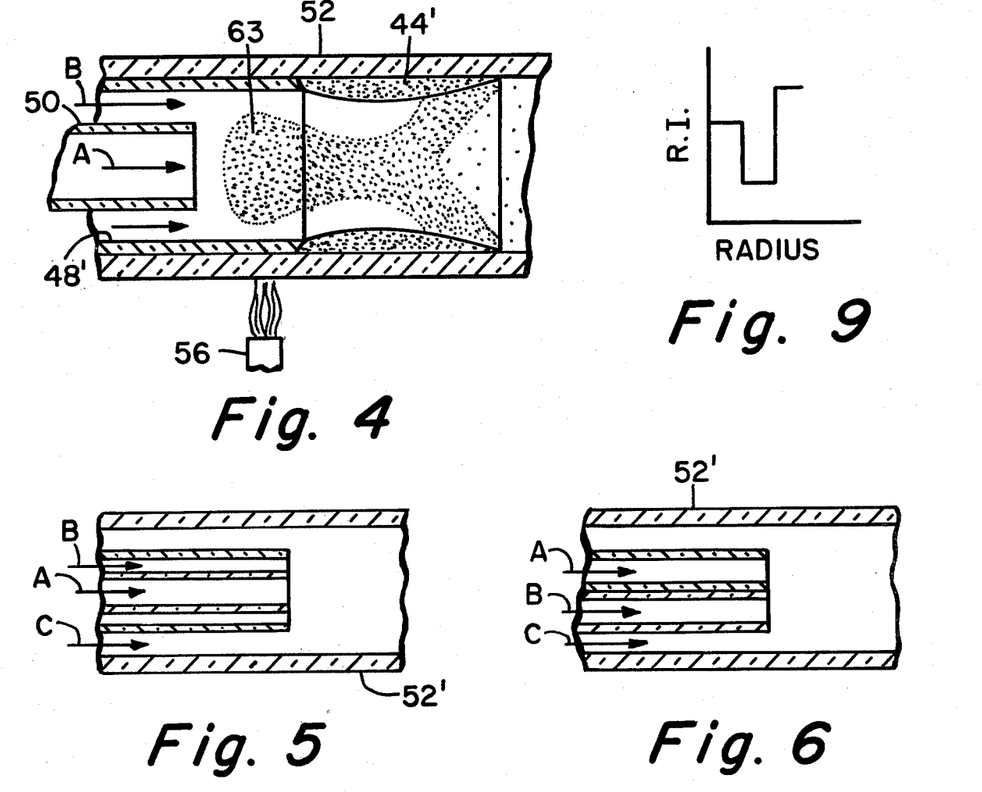
FIG. 4 is a cross-sectional view of the apparatus of the present invention depicting conditions occurring during processing.
FIGS. 5 and 6 show alternative arrangements for feeding reactants into a substrate tube.
FIG. 9 is a graph illustrating the refractive index profile of an optical fiber produced in accordance with one embodiment of this invention.

Tube 50 could be replaced by two or more tubes, each of which deliver reactants to the reaction zone. Such tubes could be coaxial as illustrated in FIG. 5 or side-by-side as illustrated in FIG. 6. All of the reactant vapors could travel through the inner tubes, as indicated by arrows A and B of FIGS. 5 and 6. One of the reactants could travel in the region between the inner tubes and outer tube 52' as indicated by arrow C of FIGS. 5 and 6. If three or more separated reactants are required, they could be supplied to the reaction zone through three or more coaxial tubes or three or more side-by-side tubes.

Referring to FIG. 3, tube 50 is mechanically coupled by means represented by dashed line 58 to burner 56 to ensure that tube 50 is continuously maintained the proper fixed distance from burner 56. Alternatively, the heat source and tube 50 may be kept stationary, and the rotating substrate tube may be traversed. The input end of tube 52 is connected to tube 50 by a collapsible member 60, a rotating seal 62 being disposed between member 60 and tube 52. Tubes 50 and 52 could also be interconnected by other types of seals which are known in the art. For example, a cap can be situated over the end of tube 52. Tube 50 passes through an aperture in the cap. A rotary seal is disposed between tube 50 and the cap.

As shown in FIG. 4, reactant vapor A emanating from tube 50 reacts with reactant vapor B flowing in the direction of the arrows between tubes 50 and 52, thereby generating particulate material 63 which flows downstream where at least a portion thereof deposits on the wall of tube 52 as shown at 44'.

The apparatus of FIGS. 3 and 4 is especially appropriate for producing by exothermic reaction in a substrate tube particulate material which forms a metal halide glass. For such reaction to occur within the substrate tube requires the employment of vaporous or volatile sources for the cation and anion of the resultant glassy product. The cationic vapor source is a compound which contains the cation of the product halide glass and bears an organometallic substituent or substituents or other anionic substituent or substituents which renders the compound into a volatile state. The anionic vapor source is a halogenating agent, i.e. a compound having halide substituents which become the anion of the product halide glass. A general equation for such reaction is MR$_{n1}$+ZX$_{m1}$→MX$_{n2}$+ZR$_{m2}$ where in the cationic vapor source:
M = the cation of the desired resultant halide glass,
R = the anion substituent of the cation, i.e. the organometallic or other substituent which renders compound, MR$_{n1}$ into a volatile state,
n$_1$ = the number of substituents required for electrical neutrality, and in the halogenating agent:
Z = the cation,
X = the halide of the halogenating agent which is to become the halide of the product metal halide glass and,
m$_1$ = the number of halides required for electrical neutrality.

The compound MX$_{n2}$ is the resultant metal halide glass, and ZR$_{m2}$ is a gaseous byproduct. In some reactions there may be a plurality of different cationic and/or anionic sources. Examples of cationic vapor sources are organometallic compounds, borohydrides and β-diketonates.

Certain organometallic compounds, especially those possessing alkyl substituents, are frequently the only materials which will render a particular cation into a volatile state suitable for reaction. Organometallic compounds vary widely in their reactivity owing primarily to the electronic distribution around the central cation. Whereas organometallic compounds of silicon such as tetramethylsilane (CH$_3$)$_4$Si are volatile, air and moisture stable, highly combustible materials, other compounds such as trimethylaluminum Al(CH$_3$)$_3$, dimethylzinc Zn(CH$_3$)$_2$, and dimethylberyllium Be(CH$_3$)$_2$ are electron deficient and are therefore pyrophoric when exposed to air and react vigorously with oxygen and water. Similarly, the highly reactive organometallic compounds undergo numerous reactions with other electron-donating reagents.

Of particular interest for use in the present invention are those reactions which produce the metal halide from gaseous halogenating agents such as BF$_3$, SiF$_4$, COF$_2$, HF, HCL, SiCL$_4$, BCl$_3$ and the like. Following are some exemplary metathesis reactions whereby gaseous and/or vaporous reactants may be delivered to the reaction zone to form solid metal halide glass materials and gaseous reaction by-products:

3BeB$_2$H$_8$+2BF$_3$→3BeF$_2$+4B$_2$H$_6$
3Be(CH$_3$)$_2$+2BF$_3$→3BeF$_2$+2B(CH$_3$)$_3$
2AlB$_3$H$_{12}$+6HF→2AlF$_3$+3B$_2$H$_6$+6H$_2$
Al(CH$_3$)$_3$+BF$_3$→AlF$_3$+B(CH$_3$)$_3$
Zn(CH$_3$)$_2$+HCl+BF$_3$→ZnCl$_2$+ZnF$_2$+B(CH$_3$)$_2$+HF, etc.

Obviously, the above list is intended to be exemplary of the numerous reactions which may be employed to obtain a metal halide glass in accordance with the present invention. The latter listed equation, which is not stoichiometrically balanced, represents a reaction whereby the combination of ZnCl$_2$ and ZnF$_2$ is formed. This optical glass material is described in Japanese patent application Disclosure 56-2265 entitled "Glass Material for Optical Glass Fiber", N. Mitaji et al., filed Aug. 3, 1979.

Although gaseous HF would probably yield the cleanest reaction chemistry, its presence may not be compatible within a SiO$_2$-based glass tube. Milder fluorinating agents are much safer to use in the formation of fluoride glasses. Compounds of the other halogens are also of interest in the present method in order to form chloride, bromide or iodide glasses. If reactions of the type forming B$_2$H$_6$ are to be employed, care should be taken due to the dangerous nature of the resulting compounds.

Vapors of the halogenating agent are preferably introduced between the interior walls of tube 52 and the exterior wall of the axially located tube 50. Vapors of the cationic vapor source would be supplied via the inner tube 50. In this manner a vaporous cationic source, especially certain organometallic compounds which would be detrimentally affected by excess heat, would be transported to the reaction zone along a path which is spaced from the hot substrate tube wall. If the vaporous cationic source is not detrimentally affected by excess heat, it could be transported as described above, or it could be transported in the annular region between tubes 50 and 52, the halogenating agent then flowing through tube 50. The reaction will commence as soon as the two streams come into contact. The particulate material then flows downstream where at least a portion thereof deposits on the wall of tube 52 in a conventional manner to form buildup 44'. While the exact shape of the region 63 of particulate material formation and flow is not known and the exact shape of deposit 44' is not known, these two regions have been illustrated in FIG. 4 in accordance with the generally accepted theory of thermophoresis force whereby particulate material is forced toward the center of a tube in the region of a burner and thereafter flows from the hot stream toward the cooler wall section of the tube downstream from the burner. A layer 48' of sintered particulate material is formed in the region heated by the external burner. Since the entire process can be conducted in a dry, clean environment and since the products themselves are expected to be of high purity, it should be possible to deposit multiple layers of pure, optical quality, hydroxyl-free metal halide core glass.

Some perceived advantages of the approach of the present invention are as follows. It should be possible to form very high purity homogeneous fluoride glass. Contaminants such as $3d$, $4d$ and $5d$ transition elements, rare earths and hydroxyl ions should be virtually eliminated by distillation of the metal alkyls, and by drying the starting gases. Nucleation sites for crystallization, for example, dirt, are eliminated. Even though toxic, non-durable glasses, such as fluoride glasses, may be employed as the core material, fiber toxicity and durability problems are minimized, since the outer cladding of the fiber is a durable, non-toxic glass. Only the fiber ends expose the fluoride glass to the environment. In typical applications the ends are hermetically sealed in splicing and coupling devices. This minimizes the risk of exposure to personnel and should greatly enhance strength characteristics. Moreover, because of the low temperatures at which reactions can be carried out and sintering and drawing can be performed, the aforementioned disadvantages of high temperature operations can be eliminated.

Both single mode and multi mode optical waveguide fibers can be made by this technique. Because of the glasses which can be formed in accordance with the present invention, extremely low loss optical fibers for propagation in the infrared region of the spectrum can be theoretically fabricated. Since it is contemplated that the light conducting region of the optical fibers may comprise such elements as beryllium and zinc, these fibers may exhibit improved resistance to ionizing radiation since these elements have slightly higher ionization potentials than silicon.

The following theoretical examples illustrate the manner in which optical waveguide fibers having metal halide glass cores can be made by low temperature deposition and drawing processes.

EXAMPLE 1

Figure 7:
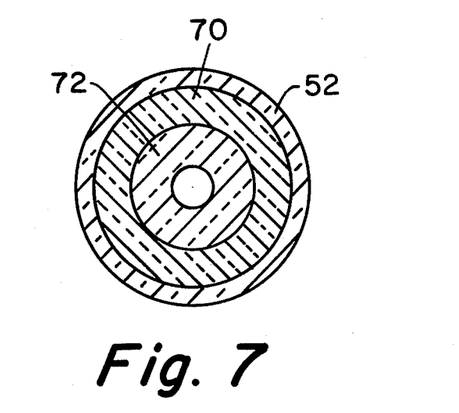
FIG. 7 shows a cross-sectional view of a substrate tube in which glass layers have been deposited.
Figure 8:
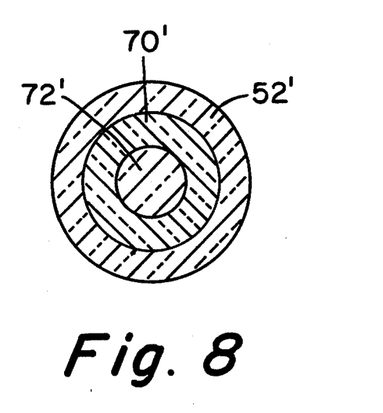
FIG. 8 shows a cross-sectional view of the substrate tube after it has been collapsed.

A commercially available alkali borosilicate glass substrate tube 52 (Corning Code 7073) having a thermal coefficient of expansion (TCE) of about $53 \times 10^{-7}/°C$. is mounted and rotated in a glass-working lathe. A reactant tube 50 of refractory material such as silica, alumina, platinum or the like is mounted in the substrate tube in the manner described hereinabove. Reservoir 64 contains $BF_3$, while reservoirs 68 and 66 contain $Be(CH_3)_2$ and $Al(CH_3)_3$, respectively. Reservoir 66 is a conventional bubbler, and reservoir 68 is a vapor generator of the type taught in U.S. Pat. No. 3,801,294. Since the vapors from reservoir 68 condense if not maintained at a temperature of about 170°C., the feed line from reservoir 68 and the entire lathe assembly are situated in oven 69 which is maintained at 190° C. As shown in FIG. 7 a barrier cladding layer 70 is initially formed on the inner surface of tube 52 by flowing reactants from reservoirs 64 and 68 into tubes 52 and 50, respectively. There is no flow at this time from reservoir 66. The reaction produces pure $BeF_2$ soot which deposits on the inner surface of tube 52 and is sintered to form layer 70. The refractive index $n_D$ of this layer is about 1.28 and the TCE thereof is about $67 \times 10^{-7}/°C$. The sintering temperature, i.e., the temperature generated at the inner surface of tube 52 by burner 56, can be approximately 500° C. After a layer of sufficient thickness has been deposited, the flow of reactants from reservoirs 64 and 68 is continued, and in addition, reactant vapors are flowed from reservoir 66 in an amount necessary to form a core glass layer, the composition of which is 7.5 mole percent $AlF_3$ and 92.5 mole percent $BeF_2$. After a layer of sufficient thickness has been deposited, tube 50 is extracted, and then the temperature of the resultant tubular member is increased to approximately 800° C., thereby causing the tube to collapse to form a blank having the cross-section illustrated in FIG. 8, wherein layers corresponding to those of FIG. 7 are represented by primed reference numerals. The collapsing step can be performed by traversing the burner at a low rate of speed along the rotating tube 52. During this operation the temperature within oven 69 should be maintained at about 500° C., the annealing temperature of tube 52, to avoid thermally-induced stresses which would otherwise cause tube breakage. A multimode fiber could be drawn from this blank at a temperature in the range of 800° C. Since the refractive index $n_D$ of the core layer 72 is about 1.31, the NA of the resultant fiber should be about 0.28. The refractive index profile of the resultant fiber is illustrated in FIG. 9. Since the refractive index of the core layer and the barrier/clad layer are less than that of the substrate tube, the barrier/clad layer must be sufficiently thick to permit it to function as the cladding of the resultant optical waveguide fiber.

EXAMPLE 2

A single mode fiber is formed in accordance with Example 1 except for the following modifications. The flow rates of $Be(CH_3)_2$ and $Al(CH_3)_3$ are adjusted to form a core of 1 mole percent $AlF_3$ and 99 mole percent $BeF_2$, the cladding layer again comprising pure $BeF_2$. The core and barrier/cladding layers are deposited in such thicknesses that in the resultant fiber the core diameter is 10 $\mu$m, and the vapor deposited barrier cladding thickness is 30 $\mu$m while the substrate tube outer cladding thickness is 27.5 $\mu$m. The core refractive index $n_D$ is 1.285. Thus, the NA is about 0.11, and the cutoff wavelength is 800 nm.

EXAMPLE 3

A soda-lime silicate glass tube, such as Corning Code 0080 glass, having a TCE of about $100 \times 10^{-7}/°C$. is employed as the substrate tube. Reservoir 64 contains $BF_3$, and reservoirs 66 and 68 contain $Pb(CH_3)_4$ and $Al(CH_3)_3$, respectively. Both of reservoirs 66 and 68 are bubblers since the reactants disposed therein are liquids. To form the barrier clad layer, the flow of reactants from reservoirs 66 and 68 is controlled such that when these reactants react with $BF_3$, a barrier clad layer having a composition of 50 mole percent $PbF_2$ and 50 mole percent $AlF_3$ is formed. Thereafter, the flow of vapors from reservoirs 66 and 68 is modified so that a core layer having a composition of 70 mole percent $PbF_2$ and 30 mole percent $AlF_3$. The average TCE of the deposited core and cladding glasses is about $130 \times 10^{-7}/°C$. The sintering step can be performed at a temperature of about 500° C. The tube collapse temperature and fiber draw temperature should be about 700° C. Since the refractive indices of the core and barrier clad glasses are about 1.71 and 1.66, respectively, the NA of the resultant fiber should be about 0.5.

EXAMPLE 4

This example sets forth a method which could be employed to form a fiber having a predominantly $ZnCl_2$ core. A glass comprising $ZnCl_2$ and $BiCl_3$ could be employed as the core layer since the refractive index thereof is higher than that of $ZnCl_2$, which is about 1.7. Since the TCE of $ZnCl_2$ is about $280 \times 10^{-7}/°C$., a high expansion substrate tube should be employed. A suitable glass for this purpose is one having the composition, 30 mole percent $SnF_2$, 34 mole percent $SnO$, 3 mole percent $PbF_2$ and 30 mole percent $P_2O_5$, which has an expansion coefficient of about $270 \times 10^{-7}/°C$. This fluorophosphate glass is described in U.S. patent application Ser. No. 160,387 entitled, "Tin-Phosphorous Oxyfluoride Glasses" filed June 17, 1980 in the name of C. M. Sanford et al. Reservoir 64 would contain HCl and reservoirs 66 and 68 would contain $Zn(C_2H_5)_2$ and $Bi(CH_3)_3$, respectively. Since all of these reactant sources are liquids, reservoirs 64, 66 and 68 are bubblers or other suitable containers for liquids. A barrier clad layer could be formed by flowing suitable amounts of vapors from reservoirs 64 and 66. The sintering temperature would be approximately 175° C. After a barrier clad layer of sufficient thickness is deposited, the flow of vapors from reservoir 68 is initiated, and the vapors from reservoirs 64, 66 and 68 would react to form the $ZnCl_2$-$BiCl_3$ core layer. The tube collapse temperature and the fiber draw temperature is about 275° C.

Whereas the above description and examples have been specifically directed to the deposition of glass layers on the inner surface of a substrate tube, it is not intended that the present invention be limited to such an apparatus and method. Indeed, it is also applicable to the outside vapor deposition (OVD) technique and the axial vapor deposition (AVD) technique, for example. Examples of the OVD technique are disclosed in U.S. Pat. Nos. 3,737,292 and 3,823,995. Examples of AVD techniques are taught in U.S. Pat. Nos. 3,957,474; 4,062,665; 4,224,046 and 4,231,774.

Figure 10:
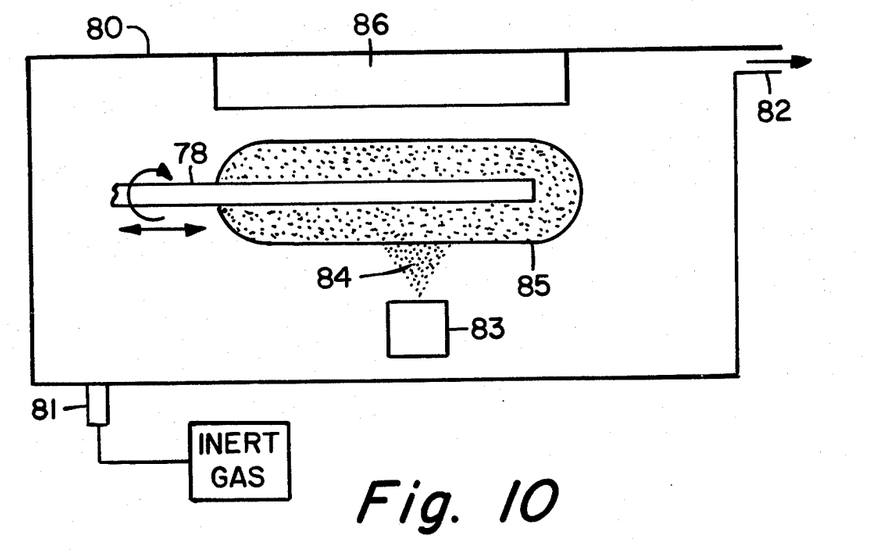
FIGS. 10 and 11 illustrate alternative embodiments whereby particulate material can be deposited to form a preform.

FIG. 10 illustrates an apparatus which can be employed to form an optical fiber preform by an OVD technique. A mandrel 78 rotates and translates back and forth in a vessel 80 as illustrated by the arrows. Dry inert gas such as Ar, $N_2$ and He is fed into vessel 80 through conduit 81 and is exhausted therefrom through conduit 82. The inert gas ensures a dry, oxygen-free atmosphere within the vessel. A generator 83 directs a stream 84 of particulate material toward mandrel 78 where a deposit is formed. Flameless heating means such as resistance heater 86 increases the temperature of the deposit so that particulate material 84 impinging upon the deposit will adhere thereto. The resultant porous preform 85 can be pulled from mandrel 78 and the consolidated in either vessel 80 or an attached environmental chamber. Thereafter, the consolidated blank can be drawn into an optical fiber in a conventional manner.

Figures 11, 12:
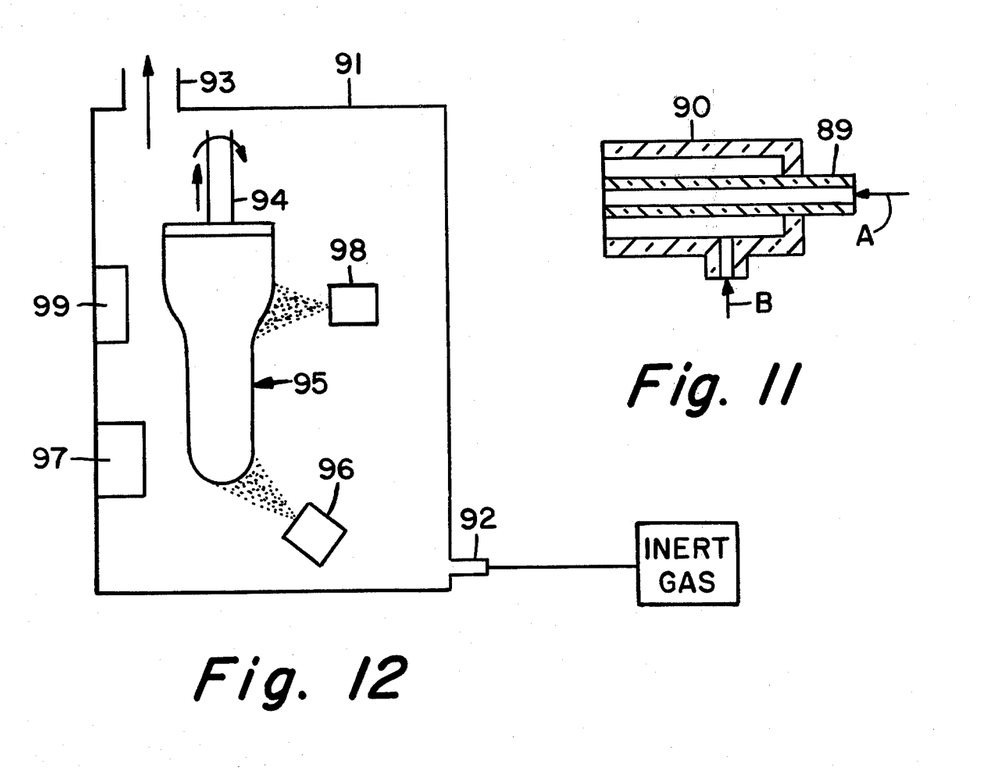
FIG. 12 shows a particulate material generator that can be employed in the apparatus of FIGS. 10 and 11.

Particulate generator 83 can be a simple coaxial vapor feed source of the type illustrated in FIG. 11. It could simply consist of concentric tubes 89 and 90. Reactants A and B described above could be fed into tubes 89 and 90, respectively. When the two reactants combine at the output end of the tubes, they spontaneously react to form a stream of particulate material.

In the embodiment of FIG. 12 a vessel 91 is supplied with dry, inert gas through conduit 92, the gas being exhausted through conduit 93 along with any gaseous by-products which are formed in vessel 91 during formation of metal halide particulate material. A mandrel 94 rotates and translates upward as indicated by the arrows. The mandrel has an enlarged end portion on which a preform 95 is formed by axial deposition of particulate material from generator 96. As the length of preform 95 increases, the mandrel moves away from generator 96 to maintain a constant distance between the preform and generator 96. Thermal energy may be supplied by a resistance heater 97 for the purpose of causing the particles to adhere to the preform or for causing the particles to actually sinter and form a preform of consolidated glass.

A layer of cladding material can be deposited on the initially formed portion of the preform by utilizing one or more additional particulate material generators 98. Another resistance heater 99, may be employed to cause the deposited particulate material from generator 98 to either adhere to the preform or to be completely consolidated thereon.

We claim:

1. In a method of forming an optical fiber preform comprising
   providing a substrate,
   forming glass precursor particulate material by flowing at least two glass forming reactants into a reaction zone adjacent to said substrate where they react to form a suspension of particulate reaction product, said at least two reactants being maintained separate until they reach said reaction zone where said reaction product is produced, and
   depositing the particulate reaction product on said substrate to yield an optical fiber preform,
   the improvement wherein said reaction product is a metal halide, one of said glass forming reactants is a compound containing a cation of the resultant metal halide and an anionic substituent which renders the compound into a volatile state, and another of said reactants is a halogenating agent.

2. The method in accordance with claim 1 wherein said one of said reactants is an organometallic compound.

3. The method according to claim 1 wherein the method is of the type which includes the step of fusing said deposit of particulate material while said particulate reaction product is being deposited to form a continuous glassy deposit.

4. In a method of manufacturing an optical device, said method being of the type that includes the steps of
providing a hollow cylindrical glass substrate tube, introducing tubular means into said substrate tube, and
flowing vapors of at least two glass-forming reactants into said cylindrical glass substrate tube where they react to form a suspension of particulate reaction product material which travels downstream where at least a portion thereof comes to rest on the inner surface of said substrate to form a deposit thereon, at least one of said reactants flowing through said tubular means whereby it is maintained separate from the remainder of said reactants until it reaches the region of said substrate wherein said reaction product is produced,
said method being characterized in that said reaction product is a metal halide, one of said glass forming reactants is a compound containing a cation of the resultant metal halide and an anionic substituent which renders the compound into a volatile state, and another of said reactants is a halogenating agent.

5. The method in accordance with claim 4 wherein said one of said reactants is an organometallic compound.

6. The method according to claim 4 wherein the method is of the type which includes the step of fusing said deposit of particulate material to form a continuous glassy deposit on the inner surface of said substrate, said method further comprising the step of heating said substrate to a temperature sufficiently high to close the aperture therein, thereby forming a preform.

7. The method according to claim 9 further comprising the steps of heating said preform to the drawing temperature of the materials thereof and drawing said preform to form an optical waveguide fiber.

8. The method according to claim 4 further comprising the step of heating said substrate to the drawing temperature thereof and drawing said preform while simultaneously fusing said deposit of particulate material and closing the aperture within said substrate to form an optical waveguide fiber.

9. In the method of manufacturing an optical waveguide preform which includes the steps of
flowing into a first tube first and second reactants which react to form particulate material, at least a portion of which forms a deposit on the inner surface of said first tube, and
moving a heat source along the outside of said first tube to sinter said deposit of particulate material and form a glass layer,
the improvement which comprises
moving a second tube within said first tube while maintaining the end of said second tube, which is within said first tube, in fixed spaced relation to said heat source, and
passing said first reactant
through said second tube, said second reactant flowing through the annular channel between said first and second tubes, whereby said first and second reactants remain separated until they become mixed downstream from the end of said second tube, one of said first and second reactants being a compound containing a cation of the resultant metal halide and an anionic substituent which renders the compound into a volatile state and the other of said first and second reactants being a halogenating agent, whereby a metal halide particulate material is formed in said first tube.

10. In a method of manufacturing an optical waveguide fiber preform, said method being of the type that includes the steps of flowing vapors of at least two glass-forming reactants into a reaction zone within a hollow cylindrical glass substrate to form metal halide particulate material, at least a portion of which comes to rest on the inner surface of said substrate to form a deposit thereon, and moving said reaction zone along the length of said substrate, the invention being characterized in that the step of flowing comprises
flowing through a first path vapors of a first compound which comprises a cation of the metal halide and an anionic substituent of the cation which renders the compound into a volatile state,
flowing through a second path vapors of a halogenating agent, and
maintaining said vapors of a halogenating agent separated from said vapors of a first compound until said vapors reach said reaction zone.

* * * * *

UNITED STATES PATENT AND TRADEMARK OFFICE
CERTIFICATE OF CORRECTION

PATENT NO. : 4,378,987
DATED : April 5, 1983
INVENTOR(S) : Stephen B. Miller and Peter C. Schultz It is certified that error appears in the above-identified patent and that said Letters Patent are hereby corrected as shown below:

Column 6, line 33, change "$SiCL_4$" to --$SiCl_4$--.

Column 10, line 13, change "the" to --then--.

Column 11, line 38, change "9" to --6--.

Signed and Sealed this

Twenty-first Day of June 1983

[SEAL]

Attest:

DONALD J. QUIGG

Attesting Officer    Acting Commissioner of Patents and Trademarks